United States Patent
Pietraniec et al.

(10) Patent No.: US 7,996,359 B2
(45) Date of Patent: Aug. 9, 2011

(54) MANAGING MULTI-NODE MULTI-VERSION SYSTEMS

(75) Inventors: Nicholas Anthony Pietraniec, Austin, TX (US); Ajay Kumar Mahajan, Austin, TX (US); Anis M Abdul, Austin, TX (US); Brent William Jacobs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/139,537

(22) Filed: Jun. 16, 2008

(65) Prior Publication Data

US 2009/0313257 A1 Dec. 17, 2009

(51) Int. Cl.
*G06F 17/00* (2006.01)

(52) U.S. Cl. ...................................... 707/610
(58) Field of Classification Search ........... 707/609–635
See application file for complete search history.

(56) References Cited

U.S. PATENT DOCUMENTS

| | | | |
|---|---|---|---|
| 7,318,070 B2 | 1/2008 | McGee et al. | |
| 2003/0005169 A1 | 1/2003 | Perks et al. | |
| 2003/0023898 A1* | 1/2003 | Jacobs et al. | 714/15 |
| 2003/0145315 A1 | 7/2003 | Aro et al. | |
| 2005/0125462 A1 | 6/2005 | Lara et al. | |
| 2005/0131964 A1* | 6/2005 | Saxena | 707/203 |
| 2005/0257211 A1 | 11/2005 | Chatterjee et al. | |
| 2006/0075398 A1 | 4/2006 | Bennett et al. | |
| 2009/0024673 A1* | 1/2009 | Barker et al. | 707/203 |
| 2009/0083210 A1* | 3/2009 | Clark et al. | 706/48 |
| 2009/0133014 A1* | 5/2009 | Laurila et al. | 717/174 |
| 2010/0125579 A1* | 5/2010 | Pardoe et al. | 707/736 |

\* cited by examiner

*Primary Examiner* — Wilson Lee
(74) *Attorney, Agent, or Firm* — Garg Law Firm, PLLC; Rekesh Garg; Libby Z. Toub

(57) ABSTRACT

A method, system, and computer usable program product for managing multi-node multi-version systems are provided in the illustrative embodiments. A process associates a version identifier with a first version of data available at a first node in the multi-node multi-version system. The version identifier corresponds to the first version of the data. The data includes an update. The process sends the data and the associated version identifier to a second node without learning a second version of data available at the second node. In one embodiment, the first version of data may be a subset of the second version of data. In another embodiment the second version of data may be a subset of the first version of data. The process repeats the sending for each update at the first node.

20 Claims, 7 Drawing Sheets

US 7,996,359 B2

MANAGING MULTI-NODE MULTI-VERSION SYSTEMS

BACKGROUND OF THE INVENTION

1. Field of the Invention

The present invention relates generally to an improved data processing system, and in particular, to a computer implemented method for managing data in a distributed data processing environment. Still more particularly, the present invention relates to a computer implemented method, system, and computer usable program code for managing multi-node multi-version systems.

2. Description of the Related Art

Present data processing environments include software applications, components of those applications, and copies thereof distributed across data networks. Operating an application in a distributed form is executing components or copies of the application on more than one data processing system in a way that the components or copies appear to be a single application with respect to another application.

A component of an application may be a portion of the application collaborating with other portions of the application. A component may also be a complete application collaborating with other applications such that the collaboration gives the appearance of an application that is larger than the component application.

In a distributed data processing environment, components of an application may operate as individual nodes on separate data processing systems. A node may be software, hardware, or a combination thereof, that is identifiable and accessible on a data network. Nodes communicate with each other, thereby facilitating communication between the components and making the overall application functional.

Users, such as a system administrator, update or modify the nodes of a distributed data processing environment from time to time. The process of updating may include correcting an error in a component executing at a node, adding additional functionality to a node, or modifying a behavior of a node by modifying the code of a component. Of course, a user may apply many other types of updates to a node in a given distributed data processing environment.

For example, in some instances, an update may include modifying substantive data that the component executing at a node presents or manipulates. In some cases, modifying the code and modifying the data may both occur in updating a node.

The nodes of a distributed data processing environment can achieve different versions through the process of updates. A node may not at the same version as another node due to the updates applied or not applied to the node. Regardless, whether the nodes are at same or different versions, the overall application should remain functional and the nodes should still be able to communicate with each other. In other words, users expect the application and nodes to continue to function as intended despite the differing versions of code or data at the various nodes.

SUMMARY OF THE INVENTION

The illustrative embodiments provide a method, system, and computer usable program product for managing multi-node multi-version systems. A process associates a version identifier with a first version of data available at a first node in the multi-node multi-version system. The version identifier corresponds to the first version of the data. The data includes an update. The process sends the data and the associated version identifier to a second node without learning a second version of data available at the second node. In one embodiment, the first version of data may be a subset of the second version of data. In another embodiment the second version of data may be a subset of the first version of data. The process repeats the sending for each update at the first node.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
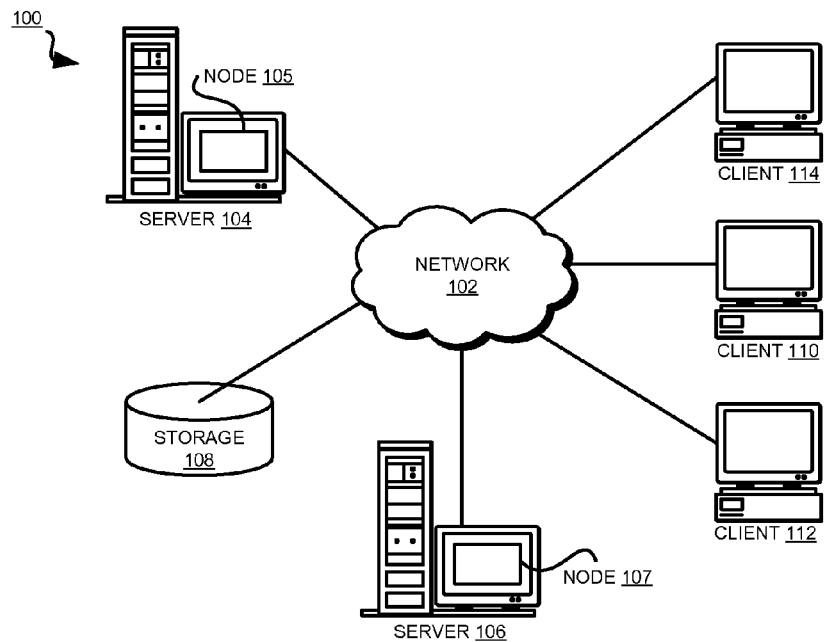
FIG. 1 depicts a pictorial representation of a network of data processing systems in which illustrative embodiments may be implemented.

The illustrative embodiments described herein provide a method, system, and computer usable program product for managing multi-node multi-version systems. The illustrative embodiments describe ways for exchanging data between nodes that may be at versions different from one another in a distributed data processing environment.

Illustrative embodiments recognize that individual nodes in a distributed environment may operate autonomously or in dependency of one another. Nodes may synchronize system-wide data to remain operational, even when operating autonomously. For example, the nodes may use subsets of some common data in order to maintain their cohesion as components of a larger system. As that data changes, nodes should receive a correct version of the correct subset of that changed data to remain functional.

Illustrative embodiments further recognize that in a system involving a substantial number of nodes, over time, a node may receive one or more software upgrades, hardware upgrades, bug-fix patches, or any other type of update from a wide variety of possible updates. Illustrative embodiments recognize that given the dynamic nature of the nodes and their versions, managing the data flow among nodes can become a tedious, expensive, and error-prone process.

For example, presently, some distributed systems blindly transfer data to the various nodes under the assumption that the sibling nodes will be able to decipher and use the data. Illustrative embodiments recognize a problem with this approach in that the new data has the potential for introducing faults in a node that may not be able to correctly decipher and use the data.

As another example, presently, some distributed systems employ a mapping technique whereby a user or a system maps the new data to the various versions required by the various nodes. As the number of nodes grows and the versions of the various nodes change over time, a user may have to maintain a large number of maps to ensure that they still correspond to the correct node and correct version. Illustrative embodiments recognize that this approach can become a resource intensive and error prone task with the passage of time and addition or removal of nodes.

Another presently used technique is to disable older nodes completely from the distributed system. Illustrative embodiments recognize that this approach can cause a loss of redundancy or computing capacity. This approach may also cause a loss of backwards compatibility where older versions of data or code may be necessary for supporting old versions of other applications.

To address these and other problems related to managing data in distributed systems, the illustrative embodiments provide a method, system, and computer usable program product for managing multi-node multi-version systems. Occasionally, the illustrative embodiments are described using a particular application or a data processing environment only as an example for the clarity of the description. The illustrative embodiments may be used in conjunction with any application or any environment that may include applications distributed over more than one node.

For example, the illustrative embodiments may be implemented in conjunction with a data network, system management application, business application, enterprise software, and middleware applications or platforms. The illustrative embodiments may be used in conjunction with a hardware component, such as in a firmware, as embedded software in a hardware device, or in any other suitable hardware or software form.

Any advantages listed herein are only examples and are not intended to be limiting on the illustrative embodiments. Additional advantages may be realized by specific illustrative embodiments. Furthermore, a particular illustrative embodiment may have some, all, or none of the advantages listed above.

Figure 2:
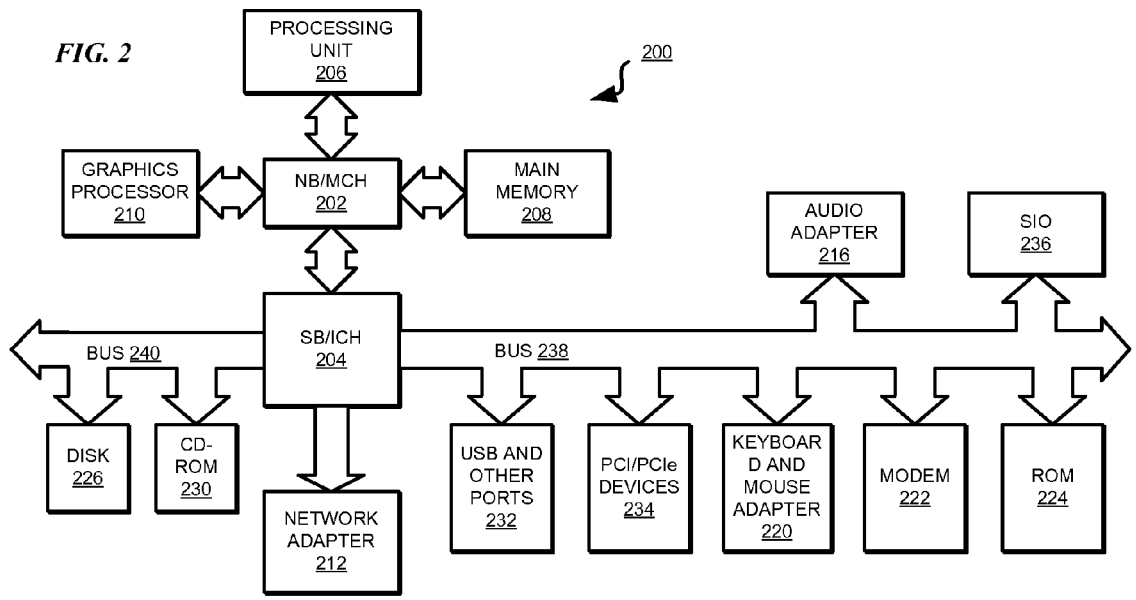
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108 that may include a storage medium.

Software applications may execute on any computer in data processing environment 100. In the depicted example, server 104 includes node 105 and server 106 includes node 107, in conjunction with which the illustrative embodiments may be implemented.

In addition, clients 112, and 114 couple to network 102. Router 120 may connect with network 102. Router 120 may use interfaces 122 and 124 to connect to other data processing systems. For example, interface 122 may use link 126, which is a communication pathway, to connect with interface 134 in computer 130. Similarly, interface 124 connects with interface 136 of computer 132 over link 128.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
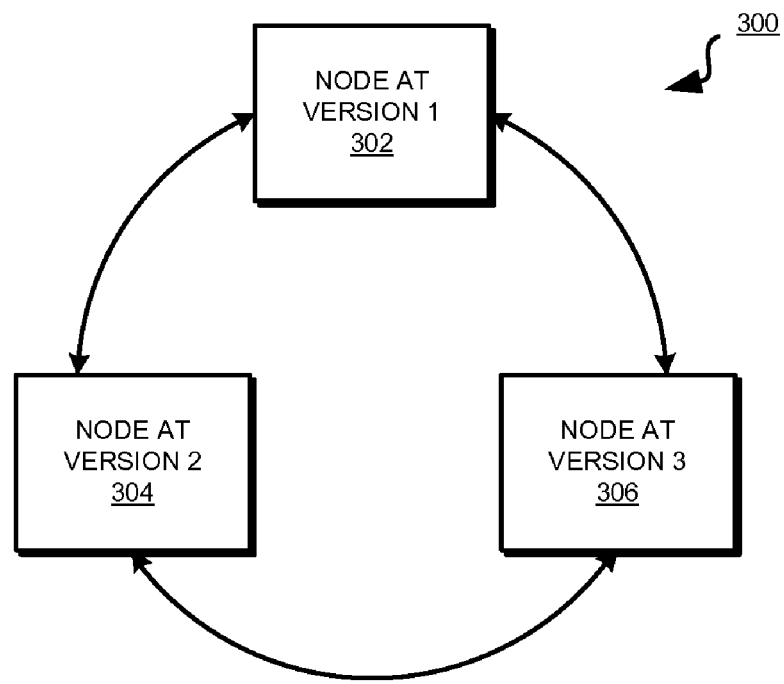
FIG. 3 depicts a block diagram of a multi-node multi-version system in which the illustrative embodiments may be implemented.

With reference to FIG. 3, this figure depicts a block diagram of a multi-node multi-version system in which the illustrative embodiments may be implemented. Multi-node multi-version system 300 may be implemented using a part of data processing environment 100 in FIG. 1. For example, in FIG. 1, nodes 105 and 107 may be two nodes of multi-node multi-version system 300.

This figure, as an example, depicts multi-node multi-version system 300 to include nodes 302, 304, and 306. The figure uses hypothetical version numbers for clarity of the description. An implementation of the illustrative embodiments may use any number of nodes and any type of versioning suitable for the particular distributed system.

A node being at a certain version is a node using code, data, or both, of that version. Accordingly, as an example, node 302 may be at version 1, node 304 at version 2 and node 306 at version 3. Nodes 302, 304, and 306 are in communication with each other over a data network, such as network 102 in FIG. 1. Using the data network, nodes 302, 304, and 306 exchange data among themselves to maintain their respective functionality and the functionality of the application distributed across those nodes as a whole.

Figure 4:
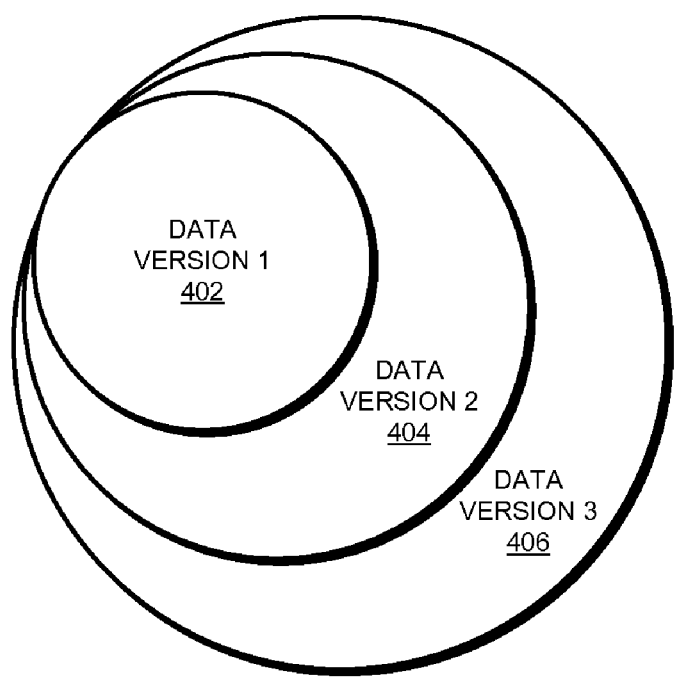
FIG. 4 depicts a Venn diagram of the data belonging to various versions according to an illustrative embodiment.

With reference to FIG. 4, this figure depicts a Venn diagram of the data belonging to various versions according to an illustrative embodiment. Data of any version depicted in this figure may be the data that any pair of nodes 302, 304, and 306 may exchange in FIG. 3.

Data 402 may be data of version 1. Data 404 may be data of version 2. Data 406 may be data of version 3. In the example depicted in this figure, an older version of data forms a subset of a newer version of the data. Accordingly, data 402 of version 1 may be a subset of data 404 of version 2. Data 404 of version 2 may in turn be a subset of data 406 of version 3.

The subset nature of the various versions as depicted in this figure is only used and described as an example and is not limiting on the illustrative embodiments. An implementation of the illustrative embodiments may use other configurations of the data in various versions without departing from the scope of the illustrative embodiments. For example, data 402 may include some data that may not be a part of data 404. As another example, data 404 and 406 may be distinct from one another such that may not a subset of data 406 at all.

Data can be configured in such a way that data of one version becomes included in the data of a later version. Such a configuration can be represented as depicted in this figure. Such a configuration of versions of data is also usable but not necessary according to some illustrative embodiments described herein.

Data of a particular version is tagged or identified with a version identifier according to an aspect of an illustrative embodiment. A version identifier may be an identifier that is numeric, alphabetic, alphanumeric, or of any other nature suitable for particular implementation. Tagging or identifying data with a version identifier is associating the version identifier with the data such that a receiver of that data may be able to recognize the version of that data.

Figure 5A:
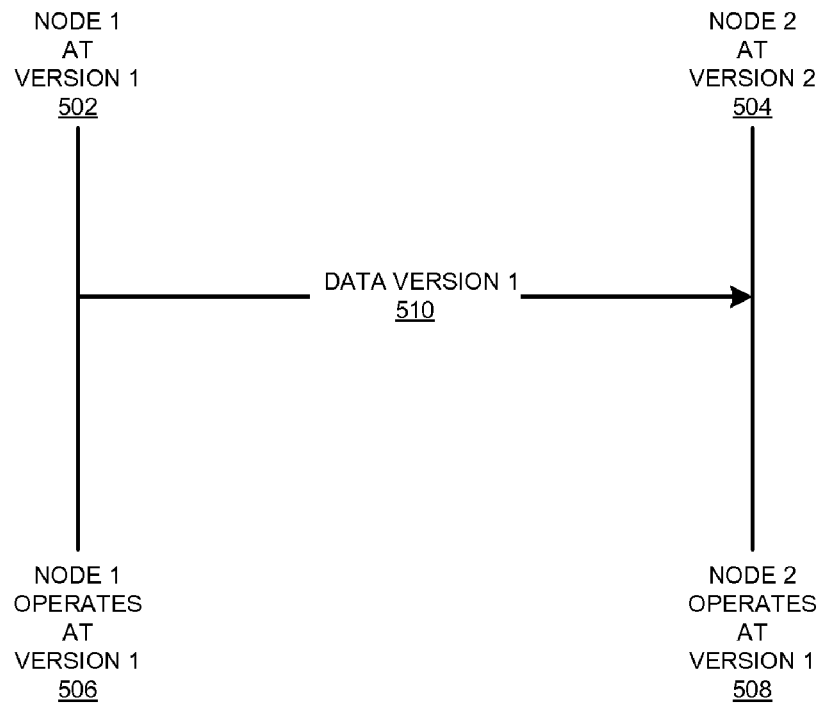
FIG. 5A depicts an example data flow diagram of managing data in a multi-node multi-version system according to an illustrative embodiment.

With reference to FIG. 5A, this figure depicts an example data flow diagram of managing data in a multi-node multi-version system according to an illustrative embodiment. Node statuses 502, 504, 506, and 508 represent status of specific nodes at specific versions before a data flow and after the data flow. Node 502 represent the status of node 1 before a data flow, showing that node 1 is at version 1 before the data flow. Node 1 may be implemented using node 302 in FIG. 3. Generally, "node x being at version y" indicates that node x is operating using version y of some data.

Similarly, node 504 represent the status of node 2 before a data flow, showing that node 2 is at version 2 before the data flow. Node 2 may be implemented using node 304 in FIG. 3. Node 506 represent the status of node 1 after a data flow, showing that node 1 continues to operate at version 1 after the data flow. Node 508 represents the status of node 2 after a data flow, showing that node 2 downgrades to operate at version 1 after the data flow.

As described above, nodes may exchange data among themselves for synchronization. Nodes may also exchange data for system management, load balancing, or any other purpose. In one example operation depicted in this figure, node 1 may send data flow 510, which may include an updated version 1 of data, to node 2. Node 2 may have been operating at version 2 before receiving data flow 510 from node 1, as indicated by node status 504.

Upon receiving data flow 510, node 2 may downgrade node 2's operation to version 1 to use the updated version 1 of the data provided by node 1. In one embodiment, node 2 may downgrade only to an extent that may allow node 2 to use the updated version 1 of the data and any part of data of version 2 that remains compatible with the updated version 1 of the data. In another embodiment, node 2 may downgrade to using only the updated version 1 of the data of data flow 510. Another embodiment may operate at version 1 using the updated data of version 1 for a predetermined time and toggle back to version 2 after the elapse of the predetermined time. An implementation may use data flow 510 at node 2 to achieve node status 508 in other ways without departing from the scope of the illustrative embodiment.

Figure 5B:
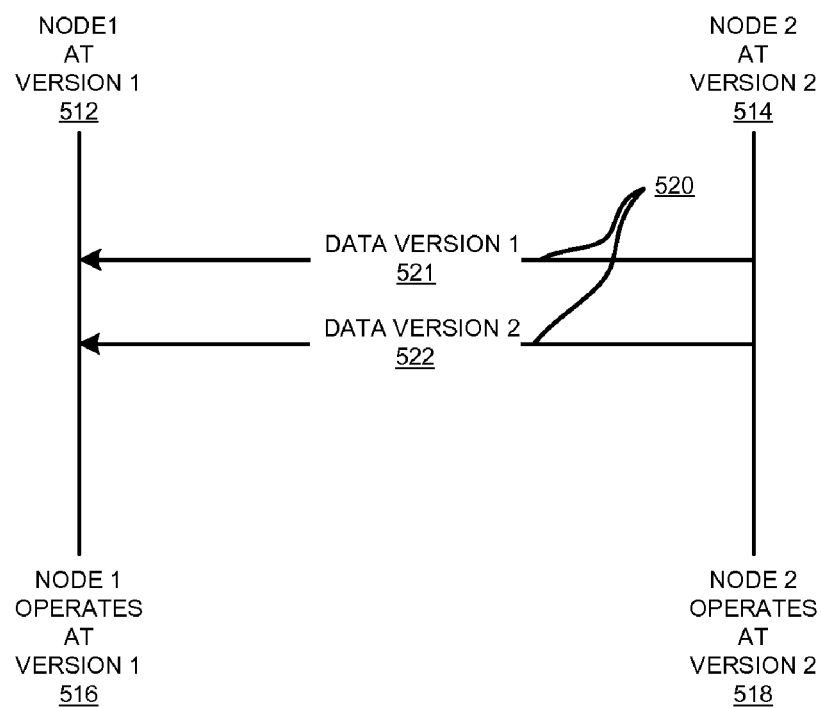
FIG. 5B depicts an example data flow diagram of managing data in a multi-node multi-version system according to an illustrative embodiment.

With reference to FIG. 5B, this figure depicts an example data flow diagram of managing data in a multi-node multi-version system according to an illustrative embodiment. Node statuses 512, 514, 516, and 518 represent status of specific nodes at specific versions before a data flow and after the data flow. Node 512 represent the status of node 1 before a data flow, showing that node 1 is at version 1 before the data flow. Node 1 may be implemented using node 302 in FIG. 3.

Similarly, node 514 represent the status of node 2 before a data flow, showing that node 2 is at version 2 before the data flow. Node 2 may be implemented using node 304 in FIG. 3. Node 516 represent the status of node 1 after a data flow, showing that node 1 continues to operate at version 1 after the data flow. Node 518 represents the status of node 2 after a data flow, showing that node 2 continues to operate at version 2 after the data flow.

In one example operation depicted in this figure, node 2 may send data flow 520 to node 1. Data flow 520 may include an update to version 2 of data. In one embodiment, data flow 520 may be two separate flows of data between node 1 and node 2. Data flow 521 may be the first data flow that may include only version 1 of the data with any updates if applicable. Data flow 522 may be the second data flow that may include only version 2 of the data with any updates if applicable. An update to version 2 may or may not affect version 1 of the data that forms a subset of the original and updated version 2 of the data.

Another embodiment may combine multiple versions of data and updates thereof in a single data flow. Such an embodiment is included in the illustrative embodiment described with respect to FIG. 5E.

Node 1 may have been operating at version 1 before receiving data flow 520 from node 2, as indicated by node status 512. Upon receiving data flow 520, including data flows 521 and 522, node 1 may determine that node 1 may not handle data version 2 and any updates to data version 2. Consequently, node 1 may accept only data version 1 and any related updates. Thus, node 1 continues operating at version 1 as represented by node status 516. An implementation may use data flow 520 at node 1 to achieve node status 516 in other ways without departing from the scope of the illustrative embodiment.

Figure 5C:
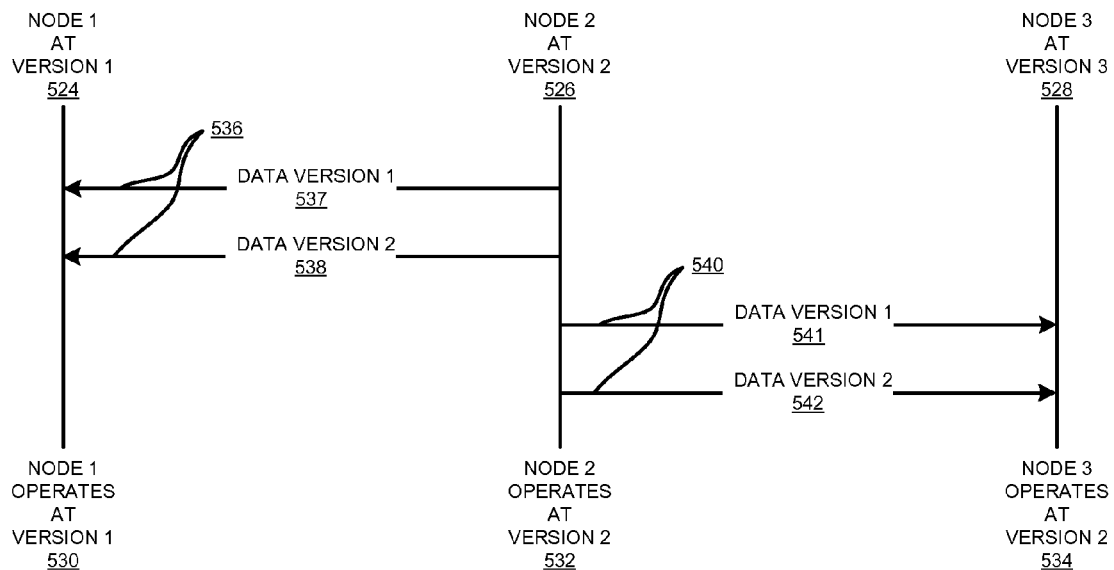
FIG. 5C depicts an example data flow diagram of managing data in a multi-node multi-version system according to an illustrative embodiment.

With reference to FIG. 5C, this figure depicts an example data flow diagram of managing data in a multi-node multi-version system according to an illustrative embodiment. Node statuses 524, 526, 528, 530, 532, and 534 represent status of specific nodes at specific versions before a data flow and after the data flow. Node 524 represent the status of node 1 before a data flow, showing that node 1 is at version 1 before the data flow. Node 1 may be implemented using node 302 in FIG. 3.

Similarly, node 526 represent the status of node 2 before a data flow, showing that node 2 is at version 2 before the data flow. Node 2 may be implemented using node 304 in FIG. 3. Node 528 represent the status of node 3 before a data flow, showing that node 3 is at version 3 before the data flow. Node 3 may be implemented using node 306 in FIG. 3.

Node 530 represent the status of node 1 after a data flow, showing that node 1 continues to operate at version 1 after the data flow. Node 532 represents the status of node 2 after a data flow, showing that node 2 continues to operate at version 2 after the data flow. Node 534 represents the status of node 3 after a data flow, showing that node 3 degrades to operate at version 2 after the data flow.

In one example operation depicted in this figure, node 2 may send data flow 536 to node 1. Data flow 536 may include an update to version 2 of data. In one embodiment, data flow 536 and data flow 540 may each be two separate flows similar to as described with respect to FIG. 5B. Another embodiment may combine multiple versions of data and updates thereof in a single data flow as described with respect to FIG. 5E below.

Node 1 may have been operating at version 1 before receiving data flow 536 from node 2, as indicated by node status 524. Upon receiving data flow 536, including data flows 537 and 538, node 1 may determine that node 1 may not handle data version 2 and any updates to data version 2. Consequently, node 1 may accept only data version 1 and any related updates. Thus, node 1 continues operating at version 1 as represented by node status 530.

Node 3 may have been operating at version 3 before receiving data flow 540 from node 2, as indicated by node status 528. Upon receiving data flow 540, including data flows 541 and 542, node 3 may determine that node 3 may handle data version 2 and any updates to data version 2. Consequently, node 3 may accept data version 2 and any related updates. Thus, node 3 may downgrade and operate at version 2 as represented by node status 534.

Node 3 may manage the downgraded operation at version 2 similar to node 2 managing the downgraded operation in FIG. 5A. An implementation may use data flows 536 and 540 to achieve node statuses 530 and 534 respectively in other ways without departing from the scope of the illustrative embodiment.

Figure 5D:
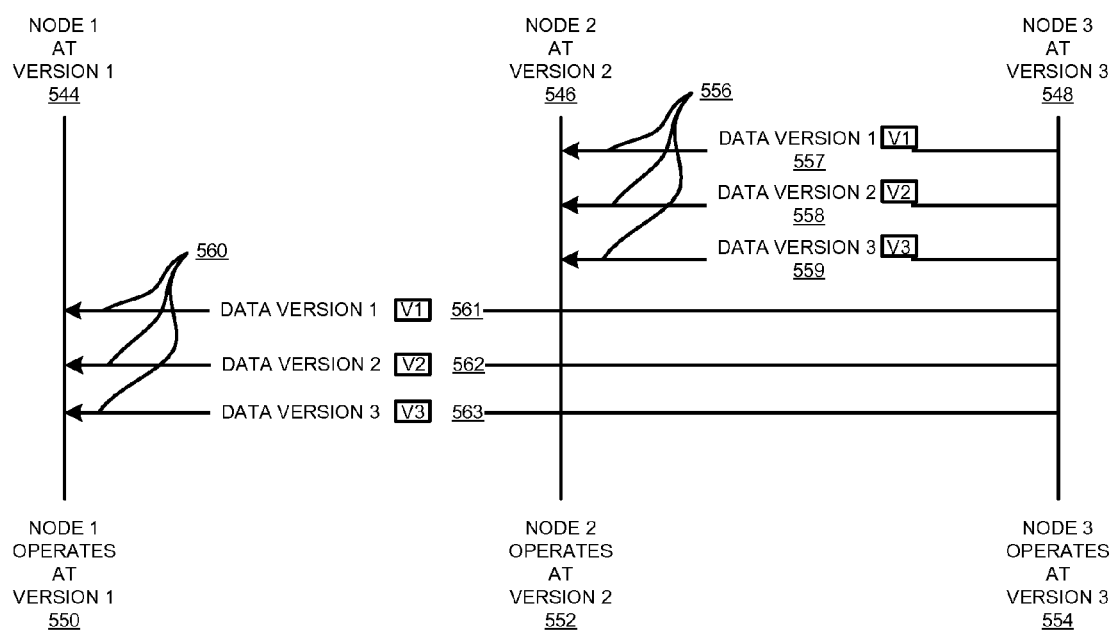
FIG. 5D depicts an example data flow diagram of managing data in a multi-node multi-version system according to an illustrative embodiment.

With reference to FIG. 5D, this figure depicts an example data flow diagram of managing data in a multi-node multi-version system according to an illustrative embodiment. Node statuses 544, 546, 548, 550, 552, and 554 represent status of nodes 1, 2, and 3 respectively in the manner described with respect to node statuses 524, 526, 528, 530, 532, and 534 respectively in FIG. 5C. Node 1 may be implemented using node 302 in FIG. 3, node 2 may be implemented using node 304 in FIG. 3, and node 3 may be implemented using node 306 in FIG. 3.

Node 550 represent the status of node 1 after a data flow, showing that node 1 continues to operate at version 1 after the data flow. Node 552 represents the status of node 2 after a data flow, showing that node 2 continues to operate at version 2 after the data flow. Node 554 represents the status of node 3 after a data flow, showing that node 3 degrades to operate at version 2 after the data flow.

In one example operation depicted in this figure, node 3 may send data flow 556 to node 2, and data flow 560 to node 1. Data flows 556 and 560 may each include an update to version 3 of data. As an example, the illustrative embodiment of this figure uses separate data flows for each version of data in data flows 556 and 560. Data flows 557, 558, and 559 are data flows containing data of versions 1, 2, and 3 respectively together with any corresponding updates to that data. Data flows 561, 562, and 563 are data flows containing data of versions 1, 2, and 3 respectively together with any corresponding updates to that data.

Node 2 may have been operating at version 2 before receiving data flow 556 from node 3, as indicated by node status 546. Upon receiving data flow 556, including data flows 557, 558, and 559, node 2 may determine that the highest data version node 2 may handle is data version 2 and any updates to data version 2. Consequently, node 2 may accept data versions 1 and 2 and any related updates. Thus, node 2 continues operating at version 2 as represented by node status 552.

Node 1 may have been operating at version 1 before receiving data flow 560 from node 3, as indicated by node status 544. Upon receiving data flow 560, including data flows 561, 562, and 563, node 1 may determine that node 1 may handle only data version 1 and any updates to data version 1. Consequently, node 1 may accept data version 1 and any related updates. Thus, node 1 may continue to operate at version 1 as represented by node status 550.

Node 3 may continue to operate at data version 3 with all updates applicable to data versions 1, 2, and 3, as represented by node status 554. An implementation may use data flows 556 and 560 to achieve node statuses 550 and 552 respectively in other ways without departing from the scope of the illustrative embodiment.

Figure 5E:
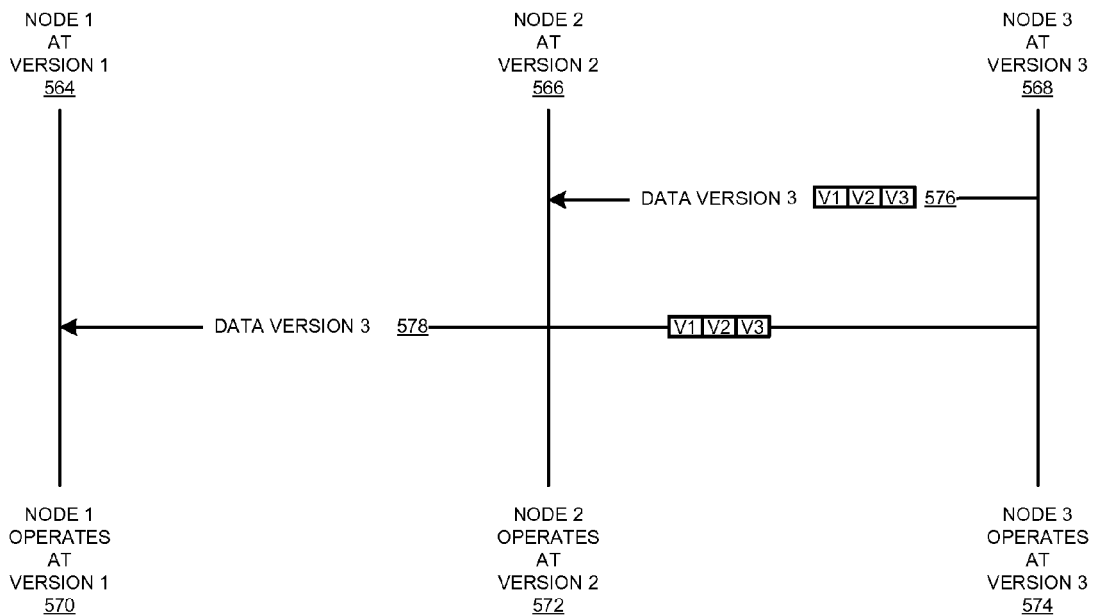
FIG. 5E depicts an example data flow diagram of managing data in a multi-node multi-version system according to an illustrative embodiment.

With reference to FIG. 5E, this figure depicts an example data flow diagram of managing data in a multi-node multi-version system according to an illustrative embodiment. Node statuses 564, 566, 568, 570, 572, and 574 represent status of nodes 1, 2, and 3 respectively in the manner described with respect to node statuses 544, 546, 548, 550, 552, and 554 respectively in FIG. 5D. Node 1 may be implemented using node 302 in FIG. 3, node 2 may be implemented using node 304 in FIG. 3, and node 3 may be implemented using node 306 in FIG. 3.

In one example operation depicted in this figure, node 3 may send data flow 576 to node 2, and data flow 578 to node 1. Data flows 576 and 578 may each be a single data flow including all versions and updates thereto available at the sending node. In the example depicted in this figure, data flows 576 and 578 may each include the data and updates to data 406 and any subsets of data 406 in FIG. 4.

Node 2 may have been operating at version 2 before receiving data flow 576 from node 3, as indicated by node status 566. Upon receiving data flow 576, including data and updates for versions 1, 2, and 3, node 2 may determine that the highest data version node 2 may handle is data version 2 and any updates to data version 2. Consequently, node 2 may accept only that subset of the data in data flow 576 that corresponds to data versions 1 and 2 and any related updates. Thus, node 2 continues operating at version 2 as represented by node status 572.

Node 1 may have been operating at version 1 before receiving data flow 578 from node 3, as indicated by node status 564. Upon receiving data flow 578, including data and updates for versions 1, 2, and 3, node 1 may determine that node 1 may handle only data version 1 and any updates to data version 1. Consequently, node 1 may accept only that subset of the data in data flow 578 that corresponds to data version 1 and any related updates. Thus, node 1 may continue to operate at version 1 as represented by node status 570.

Node 3 may continue to operate at data version 3 with all updates applicable to data versions 1, 2, and 3, as represented by node status 574. An implementation may use data flows 576 and 578 to achieve node statuses 570 and 572 respectively in other ways without departing from the scope of the illustrative embodiment.

Figure 6A:
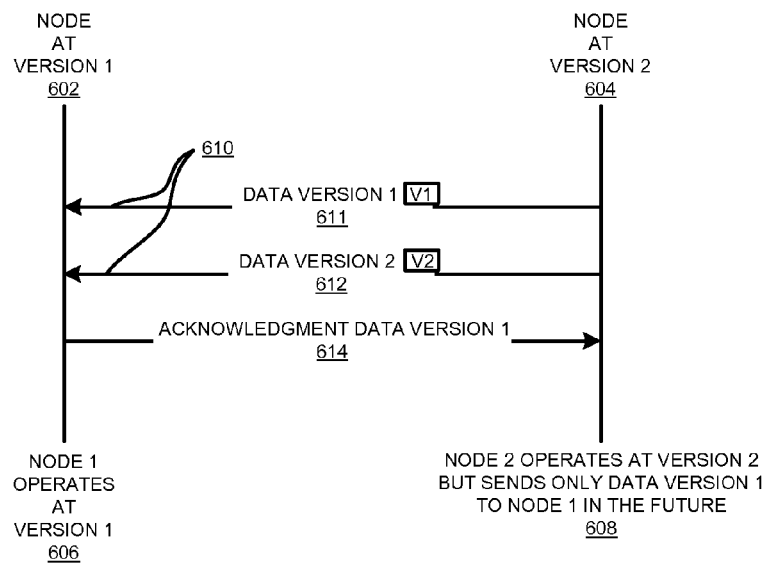
FIG. 6A depicts an example data flow diagram of managing data in a multi-node multi-version system using an acknowledgment according to an illustrative embodiment.

With reference to FIG. 6A, this figure depicts an example data flow diagram of managing data in a multi-node multi-version system using an acknowledgment according to an illustrative embodiment. Node statuses 602, 604, 606, and 608 represent status of nodes 1 and 2 in a manner similar to node statuses 502, 504, 506, and 508 respectively in FIG. 5A.

Node 1 may be implemented using node 302 in FIG. 3 and may operate at data version 1. Node 2 may be implemented using node 304 in FIG. 3 and may operate at data version 2.

FIGS. 5A-5E depicted example scenarios where a node that sent the update did not have to know a version at which a receiving node was operating. The sending node was able to send whatever one or more versions and updates it had. The receiving node was able to accept one or more versions and updates that the receiving node was capable of handling.

Figure 6B:
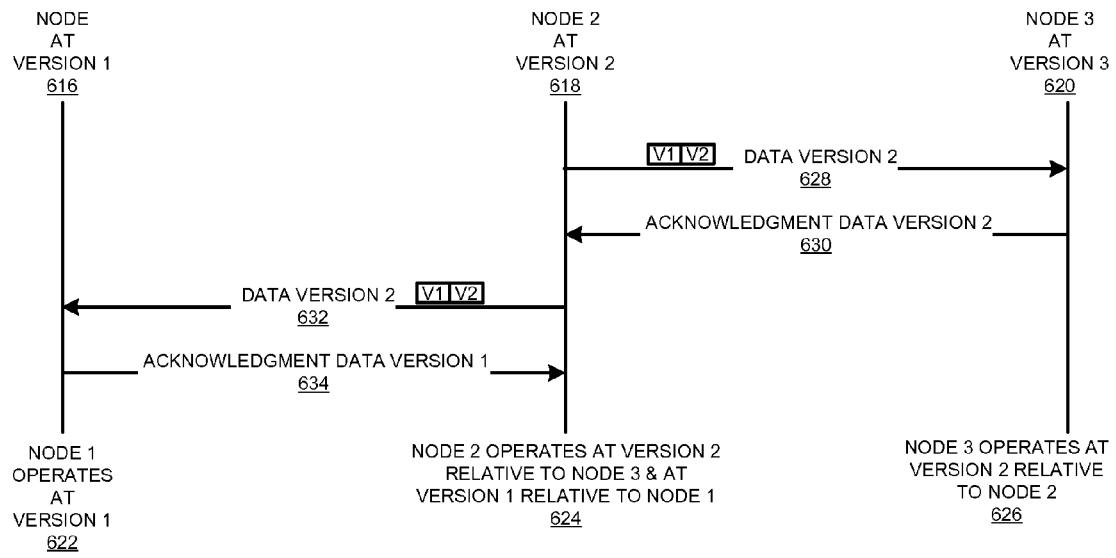
FIG. 6B depicts an example data flow diagram of managing data in a multi-node multi-version system using an acknowledgment according to an illustrative embodiment.
Figure 6C:
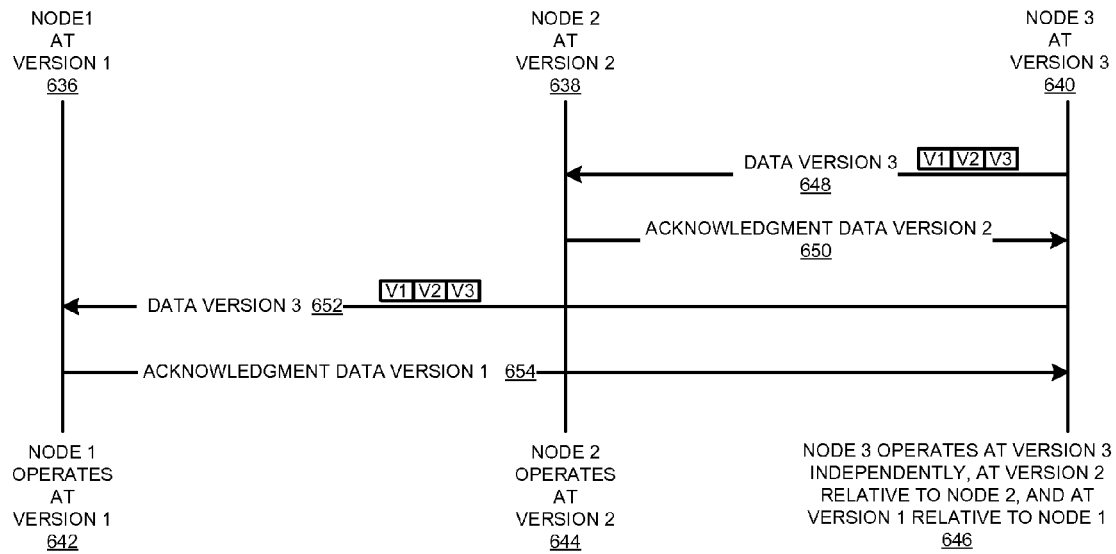
FIG. 6C depicts an example data flow diagram of managing data in a multi-node multi-version system using an acknowledgment according to an illustrative embodiment.

FIGS. 6A-6C depict example scenarios where the various nodes may perform a procedure similar to a handshake. In performing the handshake, a receiving node may inform the sending node what one or more versions the receiving node has accepted or is capable of accepting. By having this information, the sending node may tailor its future communications with that receiving node according to the versions that the receiving node is capable of handling. The sending node may also be able to perform other operations based on this information. Some examples of these other operations are included in the descriptions of FIGS. 6A-6C.

In operation, in one example scenario depicted in this figure, node 2 may send data flow 610 to node 1. Data flow 610 may include data flows 611 and 612 for data and updates pertaining to versions 1 and 2 respectively. Node 1 may have been operating at version 1 before receiving data flow 610 from node 2, as indicated by node status 602.

Upon receiving data flow 610, node 1 may choose to use only the data and updates pertaining to data version 1 from data flow 610. Node 1 may send acknowledgment 614 to node 2 acknowledging receipt of data flow 610 and indicating acceptance of data version 1. Node 1 may continue operating at data version 1 with associated updates as indicated by node status 606. Node 2 may continue operating at data version 2 with updates to data versions 1 and 2.

However, having received acknowledgment 614, node 2 may be able to take additional actions. For example, in the future, node 2 may only send a data flow to node 1 if an update is available for data version 1, as indicated by node status 608. In one embodiment, node 2 may continue to send only data version 1 and related updates to node 1 until a user, a system, an event, a message, or another factor causes node 2 to send additional data versions to node 1. In another embodiment, node 2 may transmit data version 1 updates to node 1 for a predetermined period. After the elapse of the predetermined period, node 2 may resume sending all available versions thereafter, and re-determine which versions node 1 accepts from a subsequent acknowledgment similar to acknowledgment 614. An implementation may use data flow 610 and acknowledgment 614 to achieve node statuses 606 and 608 in other ways without departing from the scope of the illustrative embodiment.

Furthermore, the example of limiting future data flows to an accepted data version is described only for clarity and is not limiting on the illustrative embodiments. An implementation may perform additional or different operations using acknowledgment 614 without departing from the scope of the illustrative embodiments.

With reference to FIG. 6B, this figure depicts an example data flow diagram of managing data in a multi-node multi-version system using an acknowledgment according to an illustrative embodiment. Node statuses 616, 618, 620, 622, 624, and 626 represent status of nodes 1, 2, and 3 in a manner similar to node statuses 524, 526, 528, 530, 532, and 534 respectively in FIG. 5C.

Node 1 may be implemented using node 302 in FIG. 3 and may operate at data version 1. Node 2 may be implemented using node 304 in FIG. 3 and may operate at data version 2. Node 3 may be implemented using node 306 in FIG. 3 and may operate at data version 3.

In operation, in one example scenario depicted in this figure, node 2 may send data flow 628 to node 3. Data flow 628 may include data and related updates for all versions available at node 2. Node 3 may have been operating at version 3 before receiving data flow 628 from node 2, as indicated by node status 620.

Upon receiving data flow 628, node 3 may determine that node 3 is able to use the data and updates pertaining to data versions 1 and 2 from data flow 628. Node 3 may send acknowledgment 630 to node 2 acknowledging receipt of data flow 628 and indicating acceptance of data versions 1 and 2.

In one embodiment, acknowledging a higher version may automatically acknowledge a lower version if present in a data flow. For example, acknowledging data and update for data version 2 may acknowledge data and updates for data versions 1 and 2.

In one embodiment, based on acknowledgment 630, node 2 may continue operating at data version 2 with associated updates with respect to node 3, as indicated by node status 624. Node 3 may operate at data version 3 when applicable. Node 3 may operate at data version 2 with respect to node 2 when communication with node 2 is involved as indicated by node status 626.

Node 2 may also send data flow 632 to node 1. Data flow 632 may include data and related updates for all versions available at node 2, namely, data versions 1 and 2. Node 1 may have been operating at version 1 before receiving data flow 632 from node 2, as indicated by node status 616.

Upon receiving data flow 632, node 1 may determine that node 1 is able to use only the data and updates pertaining to data version 1 from data flow 632. Node 1 may send acknowledgment 634 to node 2 acknowledging receipt of data flow 632 and indicating acceptance of data version 1 only.

In one embodiment, based on acknowledgment 634, node 2 may continue operating at data version 2 with associated updates when applicable. Node 1 continues to operate at data version 1, as indicated by node status 622. However, node 2 may operate at data version 1 with respect to node 1 when communication with node 1 is involved as indicated by node status 624.

Having received acknowledgments 630 and 634, node 2 may be able to take additional actions. For example, in the future, node 2 may only send a data flow to node 1 if an update is available for data version 1, as indicated by node status 624. Similarly, in the future, node 2 may send a data flow to node 3 if an update is available for data versions 1 or 2, as indicated by node status 624.

Node 2 may continue relying on the acknowledgments until a future action or for a predetermined period as described with respect to FIG. 6A. The example of limiting future data flows to an accepted data version is described only for clarity and is not limiting on the illustrative embodiments. An implementation may perform additional or different operations using acknowledgment 630 and 634 without departing from the scope of the illustrative embodiments.

With reference to FIG. 6C, this figure depicts an example data flow diagram of managing data in a multi-node multi-version system using an acknowledgment according to an illustrative embodiment. Node statuses 636, 638, 640, 642, 644, and 646 represent status of nodes 1, 2, and 3 in a manner similar to node statuses 616, 618, 620, 622, 624, and 626 respectively in FIG. 6B.

Node 1 may be implemented using node 302 in FIG. 3 and may operate at data version 1. Node 2 may be implemented using node 304 in FIG. 3 and may operate at data version 2. Node 3 may be implemented using node 306 in FIG. 3 and may operate at data version 3.

In operation, in one example scenario depicted in this figure, node 3 may send data flow 648 to node 2. Data flow 648 may include data and related updates for all versions available at node 3, namely versions 1, 2, and 3. Node 2 may have been operating at version 2 before receiving data flow 648 from node 3, as indicated by node status 638.

Upon receiving data flow 648, node 3 may determine that node 3 is able to use only the data and updates pertaining to data versions 1 and 2 from data flow 648. Node 2 may send acknowledgment 650 to node 3 acknowledging receipt of data flow 648 and indicating acceptance of data versions 1 and 2.

In one embodiment, based on acknowledgment 650, node 3 may degrade and operate at data version 2 with associated updates with respect to node 2, as indicated by node status 646. For example, node 3 may operate at data version 2 with respect to node 2 when communication with node 2 is involved as indicated by node status 646. Node 3 may also operate at data version 3 when applicable.

Node 3 may also send data flow 652 to node 1. Data flow 652 may include data and related updates for all versions available at node 3, namely, data versions 1, 2, and 3. Node 1 may have been operating at version 1 before receiving data flow 652 from node 3, as indicated by node status 636.

Upon receiving data flow 652, node 1 may determine that node 1 is able to use only the data and updates pertaining to data version 1 from data flow 652. Node 1 may send acknowledgment 654 to node 3 acknowledging receipt of data flow 652 and indicating acceptance of data version 1 only.

In one embodiment, based on acknowledgment 654, node 3 may continue operating at data version 3 with associated updates when applicable. For example, node 3 may operate at data version 1 with respect to node 1 when communication with node 1 is involved as indicated by node status 624. Node 1 continues to operate at data version 1, as indicated by node status 642.

Having received acknowledgments 650 and 654, node 3 may be able to take additional actions. For example, in the future, node 3 may only send a data flow to node 1 if an update is available for data version 1, as indicated by node status 646. Similarly, in the future, node 3 may send a data flow to node 2 only if an update is available for data versions 1 or 2, as indicated by node status 646.

Node 3 may continue relying on the acknowledgments until a future action or for a predetermined period as described with respect to FIG. 6A. The example of limiting future data flows to an accepted data version is described only for clarity and is not limiting on the illustrative embodiments. An implementation may perform additional or different operations using acknowledgment 650 and 654 without departing from the scope of the illustrative embodiments.

Figure 7:
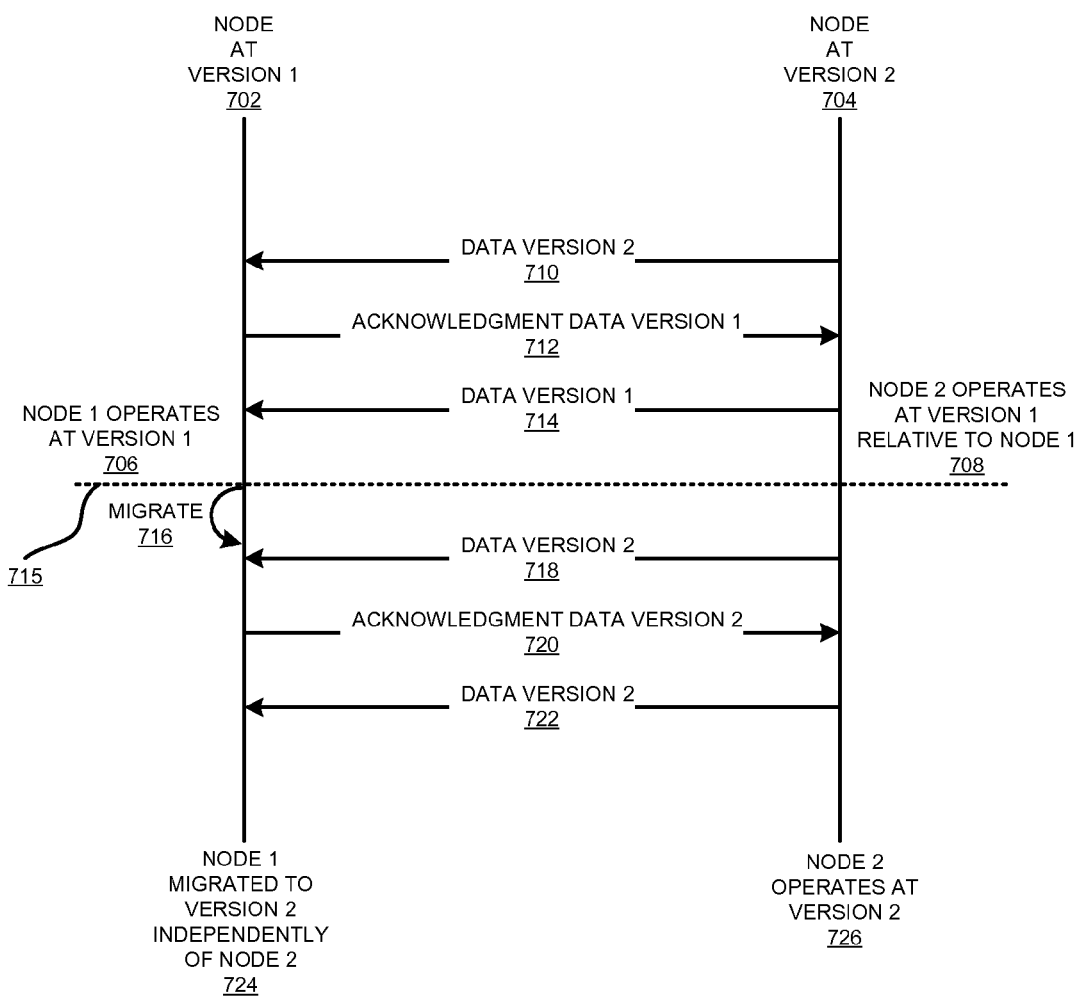
FIG. 7 depicts an example data flow diagram of flexibly managing data in a multi-node multi-version system according to an illustrative embodiment.

With reference to FIG. 7, this figure depicts an example data flow diagram of flexibly managing data in a multi-node multi-version system according to an illustrative embodiment. Node statuses 702, 704, 706, and 708 represent status of nodes 1 and 2 in a manner similar to node statuses 602, 604, 606, and 608 respectively in FIG. 6A.

Node 1 may be implemented using node 302 in FIG. 3 and may operate at data version 1. Node 2 may be implemented using node 304 in FIG. 3 and may operate at data version 2.

The acknowledgment process was described with respect to FIGS. 6A-6C. This figure depicts an example operation where the data exchange is flexibly adjusted based on those acknowledgments. In other words, the operation described with respect to this figure pertains to a process of transient or short-lived degradation.

In certain circumstances, a degradation of a node to a lower version may only be acceptable for a predetermined period. Upon elapse of that time, or upon an event in the distributed system, the node may be programmed to revert to the previous higher version if possible.

In operation, in one example scenario depicted in this figure, node 2 may send data flow 710 to node 1. Data flow 710 may include separate data flows or a single data flow for data and updates pertaining to versions 1 and 2. Node 1 may have been operating at version 1 before receiving data flow 710 from node 2, as indicated by node status 702.

Upon receiving data flow 710, node 1 may choose to use only the data and updates pertaining to data version 1 from data flow 710. Node 1 may send acknowledgment 712 to node 2 acknowledging receipt of data flow 710 and indicating acceptance of data version 1. Node 1 may continue operating at data version 1 with associated updates as indicated by node status 706.

Node 2 may continue operating at data version 2 with updates to data versions 1 and 2 when possible, and may downgrade to version 1 with respect to node 1 as indicated by node status 708. For example, at a later time, node 2 may send data flow 714 that may include only the data and updates for data version 1. Node 1 may or may not acknowledge each data flow. Node 1 and node 2 may exchange data flows similar to data flow 714 for a predetermined period or until an event occurs in the distributed system. Some examples of the events may be a change of code at a node, addition of a new node, removal of an existing node, administrator generated event, and a threshold number or range of failed requests that are incompatible with the lower data version.

At a certain point during the operation of nodes 1 and 2, depicted by line 715, a user or a system may perform migration 716, and node 1 may migrate from version 1 to a higher version, for example, version 2. Migrating a node may be another example of an event in a distributed system.

Based on migration 716, or passage of a predetermined period, mode 2 may send data flow 718, again including data and updates pertaining to all versions available at node 2, namely data versions 1 and 2. Having been migrated to version 2 in this example, node 1 may now send acknowledgment 720 to node 2 acknowledging receipt of data flow 718 and indicating acceptance of data version 2. Node 1 may continue operating at data version 2 with associated updates as indicated by node status 724.

Node 2 may also continue operating at data version 2 with updates to data versions 1 and 2, as indicated by node status 726. For example, at a later time, node 2 may send data flow 722 that may include the data and updates for data versions 1 and 2.

The examples of limiting future data flows to an accepted data version, specific events, and reversion or migration to higher versions, are described only for clarity. Such examples are not limiting on the illustrative embodiments. An implementation may perform additional or different operations using acknowledgments 714 and 720. An implementation may also use different events for triggering a reversion to a higher version without departing from the scope of the illustrative embodiments.

The components in the block diagrams and the steps in the flowcharts or data flow diagrams described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for managing multi-node multi-version systems. A distributed system having more than one node may have the nodes operating at different data versions from one another. Using the illustrative embodiments, such nodes may exchange data of different versions among the nodes. Using some illustrative embodiments, a node need not know a version at which another node may be operating before sending data to the other node.

Using other illustrative embodiments, nodes may conduct a handshake-type communication. Using the handshake, a receiving node may inform a sending node about the version at which the receiving node may be operating. The sending node may then adjust its operation according to the handshake. Furthermore, the sending node may adjust its operation only with respect to the receiving node or with respect to some other nodes as well.

Thus, using the illustrative embodiments, a distributed system with multiple nodes may be able to synchronize nodes at differing data versions, software versions, or both. Furthermore, such synchronization according to the illustrative embodiments may remove or reduce data synchronization resource requirement, errors, and mapping complexities encountered in the present distributed environments.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for managing a multi-node multi-version system, the computer implemented method comprising:

associating a version identifier with a first version of data available at a first node in the multi-node multi-version system, the version identifier corresponding to the first version of the data, the data including an update;

sending the data and the associated version identifier to a second node without having at the first node information about a second version of data available at the second node such that when the first version is lower than the second version, the sending enabling the second node to downgrade the second node's operation to the first version with respect to the first node, and when the first version is higher than the second version, the sending allowing the second node to continue operation at the second version using that part of the data which corresponds to the second version; and repeating the sending for each update at the first node.

2. The computer implemented method of claim 1, wherein the associating the version identifier includes associating a plurality of version identifiers with a plurality of versions of data available at the first node, and the sending the data and the associated version identifier includes sending the data and the plurality of version identifiers.

3. The computer implemented method of claim 2, further comprising:

receiving an acknowledgment from the second node, the acknowledgment indicating accepting the second version at the second node.

4. The computer implemented method of claim 3, further comprising:

transmitting to the second node, a subset of the data that corresponds to the second version, forming a second version data.

5. The computer implemented method of claim 4, further comprising:

determining whether one of (i) a predetermined period has elapsed, and (ii) an event has occurred in the multi-node multi-version system, forming a sending determination; and sending, responsive to the sending determination being true, the data corresponding to the first version to the second node.

6. The computer implemented method of claim 1, further comprising:

sending to a third node the data and the associated version identifier without having at the first node information about a third version of data available at the third node such that when the first version is lower than the third version, the sending enabling the third node to downgrade the third node's operation to the first version with respect to the first node, and when the first version is higher than the third version, the sending allowing the third node to continue operation at the third version using that part of the data which corresponds to the third version; and repeating the sending to the third node for each update at the first node.

7. The computer implemented method of claim 6, wherein one of (i) the first version of data is a subset of the third version of data, and (ii) the third version of data is a subset of the first version of data, and wherein one of (i) the second version of data is a subset of the third version of data, (ii) the third version of data is a subset of the second version of data, and (iii) the second version of data and the third version of data are distinct from each other.

8. The computer implemented method of claim 6, further comprising:

communicating from the first node to the second node using data corresponding to the second version; and communicating from the first node to the third node using data corresponding to the third version.

9. The computer implemented method of claim 8, further comprising:

communicating from the first node to a fourth node using data corresponding to the first version.

10. A computer usable program product comprising a non-transitory computer usable storage medium including computer usable code for managing a multi-node multi-version system, the computer usable code comprising:

computer usable code for associating a version identifier with a first version of data available at a first node in the multi-node multi-version system, the version identifier corresponding to the first version of the data, the data including an update;

computer usable code for sending the data and the associated version identifier to a second node without having at the first node information about a second version of data available at the second node such that when the first version is lower than the second version, the sending enabling the second node to downgrade the second node's operation to the first version with respect to the first node, and when the first version is higher than the second version, the sending allowing the second node to continue operation at the second version using that part of the data which corresponds to the second version, and computer usable code for repeating the sending for each update at the first node.

11. The computer usable program product of claim 10, wherein the computer usable code for associating the version identifier includes computer usable code for associating a plurality of version identifiers with a plurality of versions of data available at the first node, and the computer usable code for sending the data and the associated version identifier includes computer usable code for sending the data and the plurality of version identifiers.

12. The computer usable program product of claim 11, further comprising:

computer usable code for receiving an acknowledgment from the second node, the acknowledgment indicating accepting the second version at the second node;

computer usable code for transmitting to the second node, a subset of the data that corresponds to the second version, forming a second version data;

computer usable code for determining whether one of (i) a predetermined period has elapsed, and (ii) an event has occurred in the multi-node multi-version system, forming a sending determination; and computer usable code for sending, responsive to the sending determination being true, the data corresponding to the first version to the second node.

13. The computer usable program product of claim 10, further comprising:

computer usable code for sending to a third node the data and the associated version identifier without having at the first node information about a third version of data available at the third node such that when the first version is lower than the third version, the sending enabling the third node to downgrade the third node's operation to the first version with respect to the first node, and when the first version is higher than the third version, the sending allowing the third node to continue operation at the third version using that part of the data which corresponds to the third version, wherein one of (i) the first version of data is a subset of the third version of data, and (ii) the third version of data is a subset of the first version of data, and wherein one of (i) the second version of data is a subset of the third version of data, (ii) the third version of data is a subset of the second version of data, and (iii) the second version of data and the third version of data are distinct from each other; and computer usable code for repeating the sending to the third node for each update at the first node.

14. The computer usable program product of claim 13, further comprising:

computer usable code for communicating from the first node to the second node using data corresponding to the second version; and computer usable code for communicating from the first node to the third node using data corresponding to the third version.

15. The computer usable program product of claim 14, further comprising:

computer usable code for communicating from the first node to a fourth node using data corresponding to the first version.

16. A data processing system for managing a multi-node multi-version system, the data processing system comprising:

a storage device, wherein the storage device stores computer usable program code; and a processor, wherein the processor executes the computer usable program code, and wherein the computer usable program code comprises:

computer usable code for associating a version identifier with a first version of data available at a first node in the multi-node multi-version system, the version identifier corresponding to the first version of the data, the data including an update;

computer usable code for sending the data and the associated version identifier to a second node without having at the first node information about a second version of data available at the second node such that when the first version is lower than the second version, the sending enabling the second node to downgrade the second node's operation to the first version with respect to the first node, and when the first version is higher than the second version, the sending allowing the second node to continue operation at the second version using that part of the data which corresponds to the second version; and computer usable code for repeating the sending for each update at the first node.

17. The data processing system of claim 16, wherein
the computer usable code for associating the version identifier includes computer usable code for associating a plurality of version identifiers with a plurality of versions of data available at the first node, and
the computer usable code for sending the data and the associated version identifier includes computer usable code for sending the data and the plurality of version identifiers.

18. The data processing system of claim 17, further comprising:
computer usable code for receiving an acknowledgment from the second node, the acknowledgment indicating accepting the second version at the second node;
computer usable code for transmitting to the second node, a subset of the data that corresponds to the second version, forming a second version data;
computer usable code for determining whether one of (i) a predetermined period has elapsed, and (ii) an event has occurred in the multi-node multi-version system, forming a sending determination; and
computer usable code for sending, responsive to the sending determination being true, the data corresponding to the first version to the second node.

19. The data processing system of claim 16, further comprising:
computer usable code for sending to a third node the data and the associated version identifier without having at the first node information about a third version of data available at the third node such that when the first version is lower than the third version, the sending enabling the third node to downgrade the third node's operation to the first version with respect to the first node, and when the first version is higher than the third version, the sending allowing the third node to continue operation at the third version using that part of the data which corresponds to the third version, wherein one of (i) the first version of data is a subset of the third version of data, and (ii) the third version of data is a subset of the first version of data, and wherein one of (i) the second version of data is a subset of the third version of data, (ii) the third version of data is a subset of the second version of data, and (iii) the second version of data and the third version of data are distinct from each other; and
computer usable code for repeating the sending to the third node for each update at the first node.

20. The data processing system of claim 19, further comprising:
computer usable code for communicating from the first node to the second node using data corresponding to the second version;
computer usable code for communicating from the first node to the third node using data corresponding to the third version; and
computer usable code for communicating from the first node to a fourth node using data corresponding to the first version.

* * * * *